United States Patent
Kim et al.

(10) Patent No.: US 8,526,381 B2
(45) Date of Patent: Sep. 3, 2013

(54) APPARATUS AND METHOD FOR MANAGING MULTI-CARRIER

(75) Inventors: Juhee Kim, Daejeon (KR); Eunkyung Kim, Seoul (KR); Sook Jin Lee, Daejeon (KR); Kyung Soo Kim, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 211 days.

(21) Appl. No.: 13/060,315

(22) PCT Filed: Sep. 4, 2009

(86) PCT No.: PCT/KR2009/005029
§ 371 (c)(1),
(2), (4) Date: Feb. 23, 2011

(87) PCT Pub. No.: WO2010/027223
PCT Pub. Date: Mar. 11, 2010

(65) Prior Publication Data
US 2011/0149898 A1    Jun. 23, 2011

(30) Foreign Application Priority Data
Sep. 5, 2008 (KR) .................... 10-2008-0087914
Sep. 4, 2009 (KR) .................... 10-2009-0083664

(51) Int. Cl.
*G01R 31/08* (2006.01)

(52) U.S. Cl.
USPC .......................................... 370/329; 719/314

(58) Field of Classification Search
USPC ......... 370/201, 204–205, 236–238, 252–253, 370/350, 328–339, 419, 463, 389–390, 428–429; 375/254, 260; 719/314
See application file for complete search history.

(56) References Cited

U.S. PATENT DOCUMENTS

| | | | |
|---|---|---|---|
| 2005/0135312 A1 | 6/2005 | Montojo et al. | |
| 2007/0127516 A1 | 6/2007 | Czaja et al. | |
| 2007/0141994 A1 | 6/2007 | Cheng | |
| 2007/0268900 A1 | 11/2007 | Park et al. | |
| 2008/0151743 A1* | 6/2008 | Tong et al. | 370/204 |
| 2008/0316969 A1* | 12/2008 | Prakash et al. | 370/331 |
| 2011/0149912 A1* | 6/2011 | Jung et al. | 370/331 |

FOREIGN PATENT DOCUMENTS

| | | |
|---|---|---|
| KR | 10-2007-0112573 A | 11/2007 |
| KR | 10-2008-0071553 A | 8/2008 |
| WO | WO2008054099 | * 5/2008 |

* cited by examiner

*Primary Examiner* — Ricky Ngo
*Assistant Examiner* — Iqbal Zaidi
(74) *Attorney, Agent, or Firm* — Jefferson IP Law, LLP

(57) ABSTRACT

An apparatus for managing a multi-carrier in a communication system supporting the multi-carrier receives channel quality information of multi-carriers from a terminal and directs the terminal to change a primary carrier from a current primary carrier to one carrier of the multi-carriers on the basis of reference information including channel quality information.

14 Claims, 6 Drawing Sheets

APPARATUS AND METHOD FOR MANAGING MULTI-CARRIER

TECHNICAL FIELD

The present invention relates to an apparatus and a method for managing a multi-carrier.

BACKGROUND ART

In general, one of multi-carriers is used as a primary carrier and the remaining multi-carriers are used as secondary carriers.

In a wireless communication system supporting multi-carriers, a map message providing resource allocation information can be transmitted through the primary carrier and the plurality of secondary carriers. However, when the map message is transmitted while being loaded on several carriers, a terminal that receives the map message should process the map message in all carriers for each frame regardless of whether or not it is data that the terminal itself will receive. Further, a base station transmits duplicated resource allocation information through various carriers to cause inefficient management of resources. Therefore, it is necessary to transmit the map message through the primary carrier.

However, the wireless communication system has a characteristic of a wireless channel environment that is frequently changed. As a result, a channel characteristic of the primary carrier may deteriorate and a channel characteristic of the secondary carrier may be better than the channel characteristic of the primary carrier. When the channel characteristic of the secondary carrier is better than the channel characteristic of the primary carrier, the map message transmitted through the primary carrier consumes more wireless resources than the map message transmitted through the secondary carrier.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide an apparatus and a method for managing a multi-carrier having advantages of reducing a processing load of a map message of a terminal and efficiently managing the multi-carrier depending on a state of a channel.

Solution to Problem

A first embodiment of the present invention provides a method for managing a multi-carrier in a base station of a communication system supporting the multi-carrier. This method includes receiving channel quality information of the multi-carrier from a terminal, and directing the terminal to change a primary carrier from a current primary carrier to one carrier of the multi-carriers on the basis of reference information including the channel quality information.

A second embodiment of the present invention provides an apparatus for managing a multi-carrier in a base station of a communication system supporting the multi-carrier. This apparatus includes a channel information receiver, a primary carrier determiner, and a change requester. The channel information receiver receives channel quality information of each of the multi-carriers from a terminal. The primary carrier determiner selects one carrier among the multi-carriers on the basis of reference information including the channel quality information of each carrier. In addition, the change requester directs the terminal to change the primary carrier to the one carrier from a current primary carrier.

A third embodiment of the present invention provides a method for managing a multi-carrier in a base station of a communication system supporting the multi-carrier. This method includes receiving channel quality information of the multi-carriers from a terminal, and directing the terminal to change a primary carrier to one carrier among the multi-carriers in a current primary carrier in accordance with the channel quality information and a load distribution value of the multi-carriers.

A fourth embodiment of the present invention provides a method for managing a multi-carrier in a communication system supporting the multi-carrier. This method includes assigning the carriers to a primary carrier or a secondary carrier, re-assigning one of the carriers assigned to the secondary carrier to the primary carrier, and changing the primary carrier according to the re-assigning.

Advantageous Effects of Invention

According to an embodiment of the present invention, in a wireless communication system supporting a multi-carrier, it is possible to minimize wireless resources consumed to transmit a map message to a terminal by dynamically changing a primary carrier in consideration of a channel characteristic of each carrier. Further, a base station transmits the map message to the terminal through one primary carrier to thereby reduce a processing load of the map message of the terminal.

MODE FOR THE INVENTION

Figure 1:
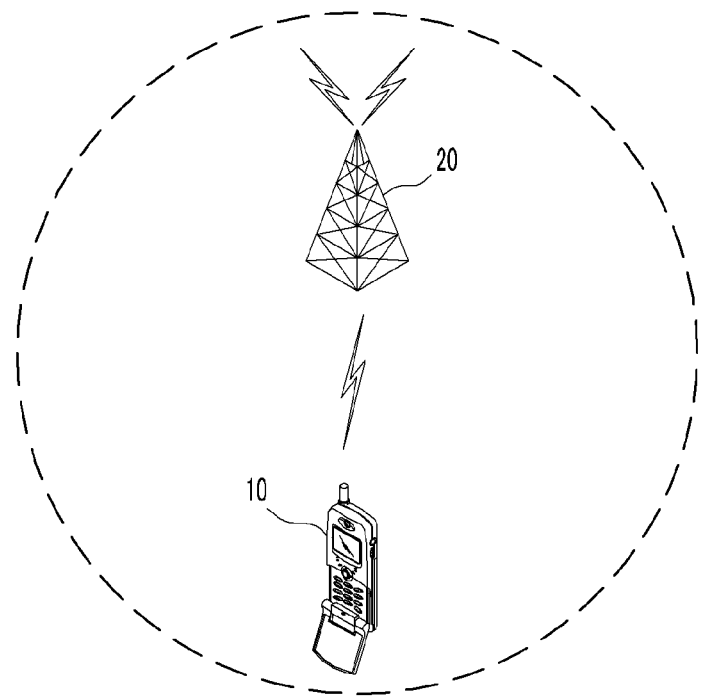
FIG. 1 is a schematic diagram illustrating a wireless communication system supporting a multi-carrier according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification and the appended claims, unless explicitly described to the contrary, the word "comprise" and variations such as "comprises" or "comprising" will be understood to imply the inclusion of stated elements but not the exclusion of any other elements.

In the specification, a terminal may designate a mobile station (MS), a mobile terminal (MT), a subscriber station (SS), a portable subscriber station (PSS), user equipment (UE), an access terminal (AT), etc., and may include the entire or partial functions of the terminal, the mobile terminal, the subscriber station, the portable subscriber station, the user equipment, the access terminal, etc.

In the specification, a base station (BS) may designate an access point (AP), a radio access station (RAS), a node B, an evolved node B (eNodeB), a base transceiver station (BTS), a mobile multihop relay (MMR)-BS, etc., and may include the entire or partial functions of the access point, the radio access station, the node B, the evolved node B, the base transceiver station, the MMR-BS, etc.

Hereinafter, an apparatus and a method for managing a multi-carrier in a wireless system supporting the multi-carrier according to an embodiment of the present invention will be described in detail with reference to the accompanying drawings.

Figure 2:
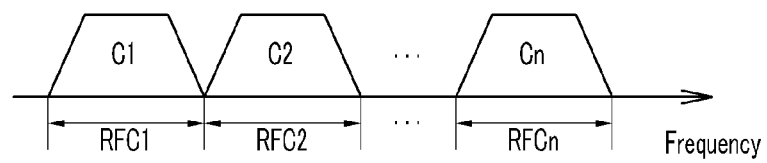
FIG. 2 is a diagram illustrating a multi-carrier.

FIG. 1 is a schematic diagram illustrating a wireless communication system that supports a multi-carrier according to an embodiment of the present invention, and FIG. 2 is a diagram illustrating a multi-carrier.

Referring to FIG. 1, the wireless communication system that supports the multi-carrier includes a terminal 10 and a base station 20.

The terminal 10, as an end point of a wireless channel, supports multi-carriers C1 to Cn having frequency bands RFC1 to RFCn as shown in FIG. 2. Therefore, the terminal 10 communicates with the base station 20 by using the multi-carriers C1 to Cn having the frequency bands RFC1 to RFCn.

The base station 20 communicates with the terminal 10 that is positioned in a cell area, and includes a carrier management device (not shown) that manages the multi-carriers C1 to Cn that are supported by the terminal 10.

The carrier management device (not shown) sets one carrier of the multi-carriers as a primary carrier and sets the remaining carriers as secondary carriers. At this time, the carrier management device (not shown) can allocate the secondary carriers to the terminal 10 depending on a system load, a maximum data transmission speed, a quality of service (QoS) request, etc. The terminal 10 maintains wireless and physical layer connections with the base station 20 through the primary carrier. The primary carrier is a carrier for transmitting and receiving various control information and data between the terminal 10 and the base station 20, and the subcarrier is an additional subcarrier used for transmitting and receiving the data in a state in which the terminal transmits and receives the control information through the primary carrier.

Figure 3:
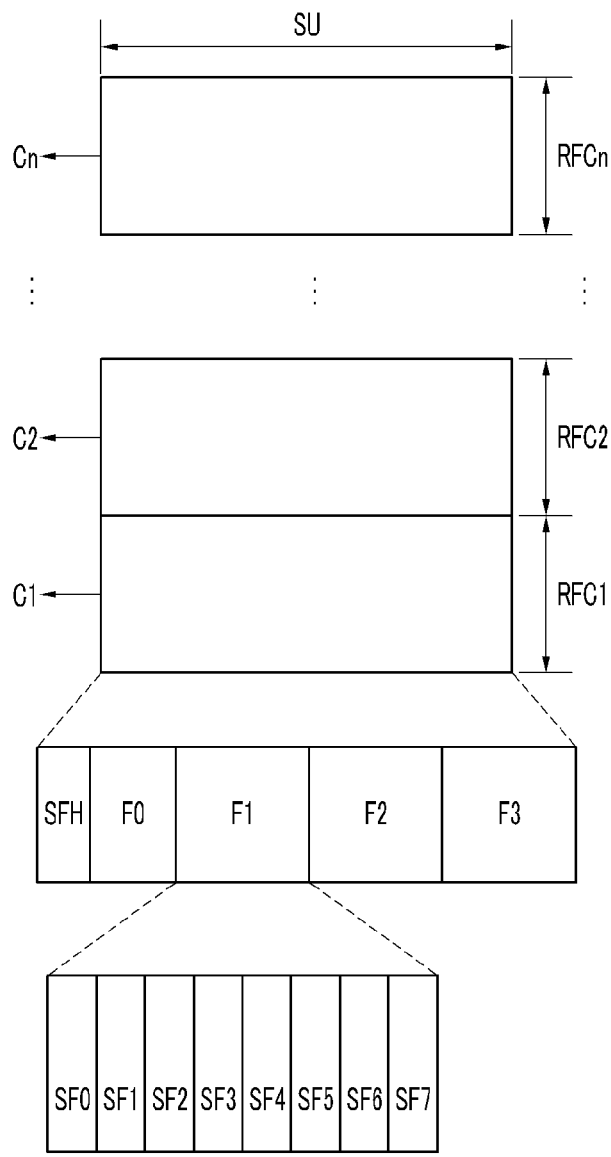
FIG. 3 is a diagram illustrating a frame structure of a wireless communication system supporting a multi-carrier according to an embodiment of the present invention.

FIG. 3 is a diagram illustrating a frame structure of a wireless communication system supporting a multi-carrier according to an embodiment of the present invention.

Referring to FIG. 3, the terminal 10 and the base station 20 transmit and receive signals through a superframe SU in the frequency bands RFC1 to RFCn of the carriers C1 to Cn.

One superframe SU includes a plurality of continued frames F0 to F3. In FIG. 3, one superframe SU includes four frames F0 to F3.

Each of the frames F0 to F3 may include a plurality of subframes SF0 to SF7.

The superframe SU includes a superframe header SFH, and the superframe header SFH may be positioned at a start point of a first frame F0 among the plurality of frames F0 to F3. That is, the superframe header SFH may be positioned in the first subframe SF0 of the first frame F0.

Figure 4:
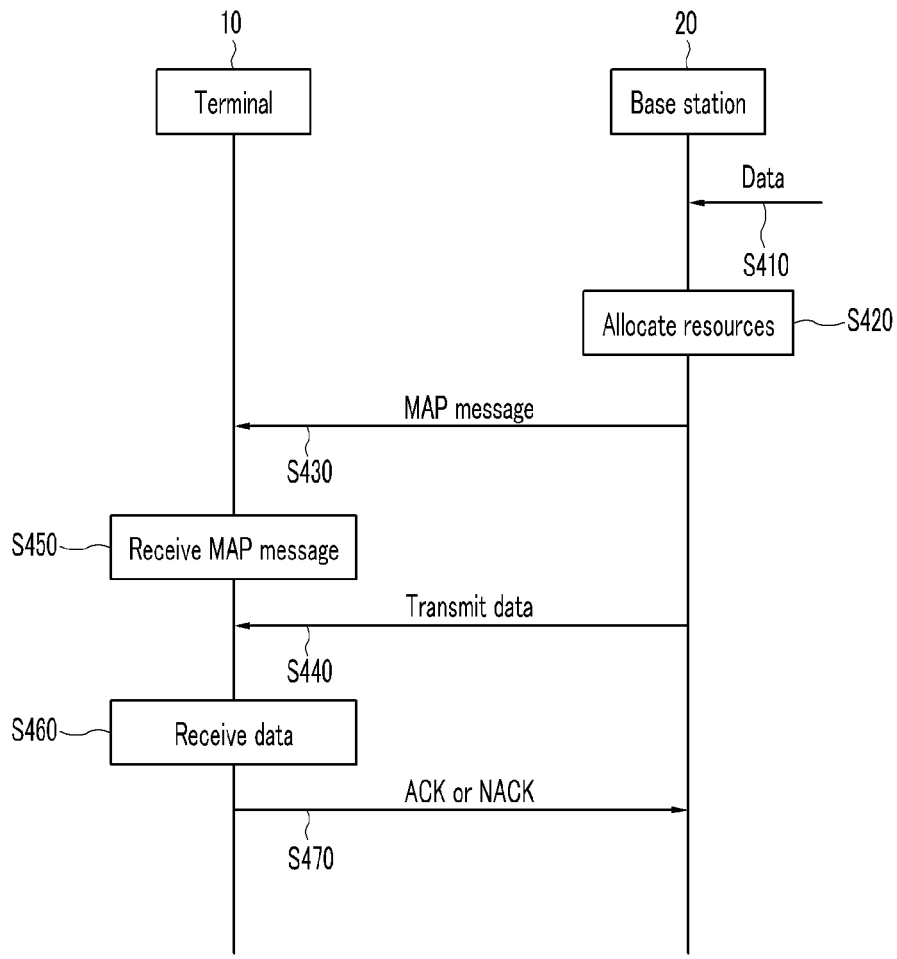
FIG. 4 is a diagram illustrating a method for transmitting data according to an embodiment of the present invention.

FIG. 4 is a diagram illustrating a method for transmitting data according to an embodiment of the present invention.

Referring to FIG. 4, when data to be transmitted to the terminal 10 is generated (S410), the base station 20 allocates resources to the frame (S420) and transmits the resource allocation information that is included in a map message to the terminal through the primary carrier (S430). In addition, the base station 20 transmits the data by using the allocated resources (S440). According to the embodiment of the present invention, a carrier management device (not shown) of the base station 20 determines the primary carrier in consideration of reference information such as a channel quality characteristic of each carrier, a load distribution degree of each carrier, etc.

The terminal 10 receives the data by using the resource allocation information (S460) after receiving the map message (S450). Thereafter, when the terminal 10 succeeds in receiving the data, the terminal 10 transmits an acknowledge response (ACK) to the base station 20, and when the terminal 10 fails in receiving the data, the terminal 10 transmits a non-acknowledge response (NACK) to the base station 20 (S470).

Figure 5:
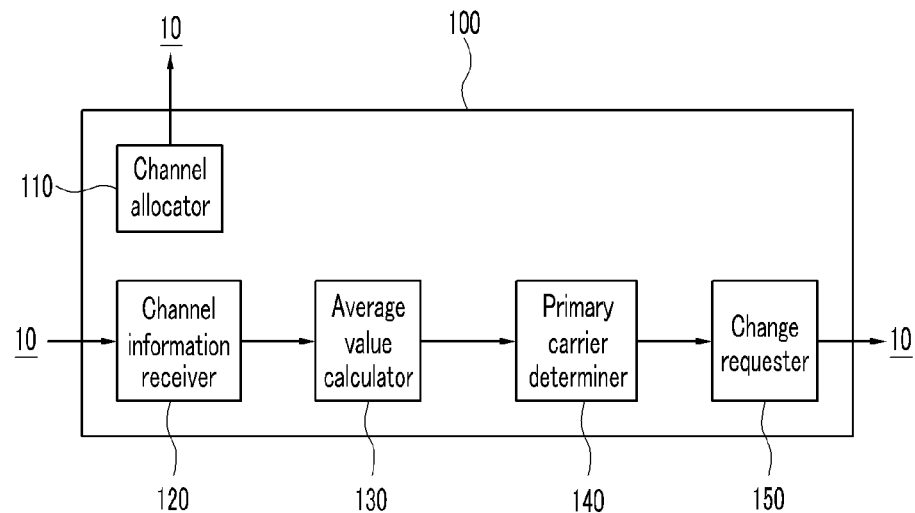
FIG. 5 is a block diagram illustrating an apparatus for managing a multi-carrier according to an exemplary embodiment of the present invention.
Figure 6:
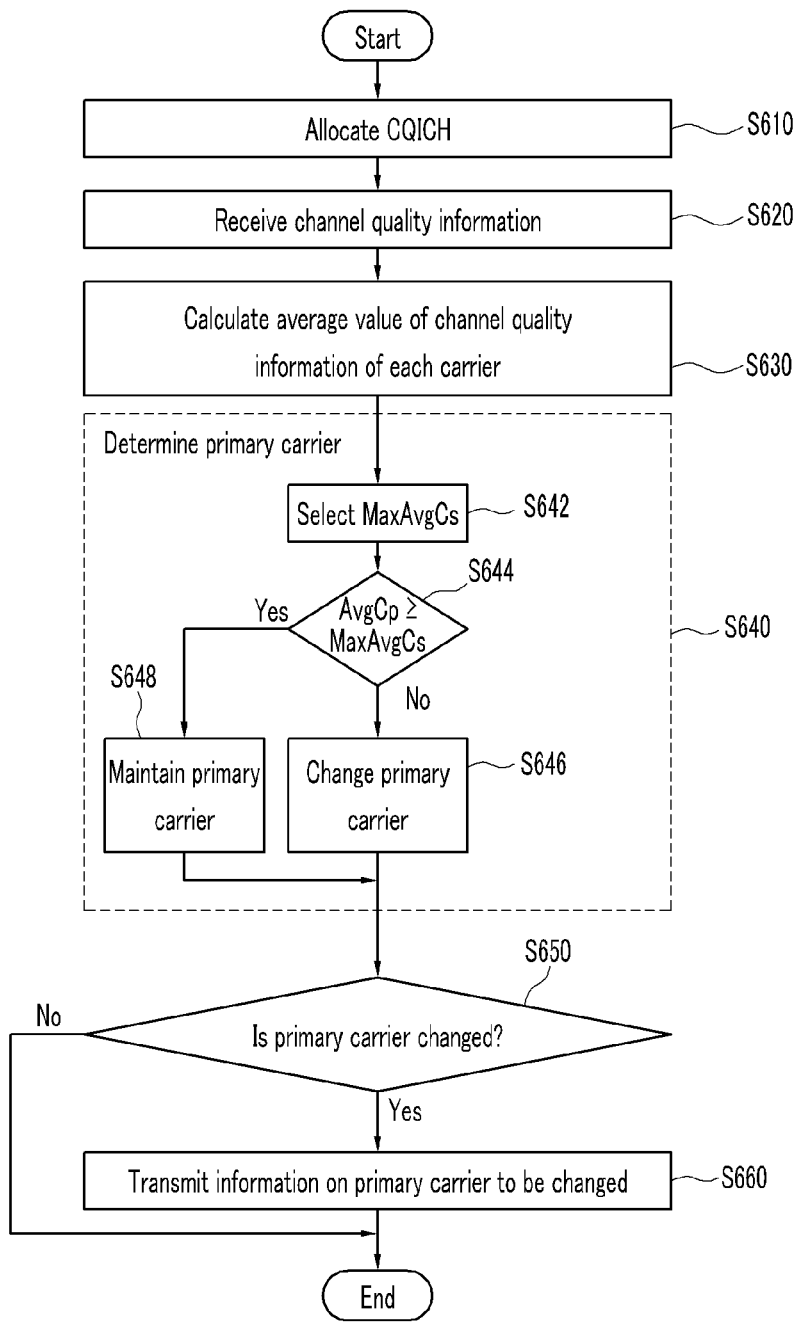
FIG. 6 is a diagram illustrating a method for changing a primary carrier according to a first embodiment of the present invention.

FIG. 5 is a block diagram illustrating an apparatus for managing a multi-carrier according to an embodiment of the present invention, and FIG. 6 is a diagram illustrating a method for changing a primary carrier according to a first embodiment of the present invention.

Referring to FIG. 5, the multi-carrier managing apparatus 100 includes a channel allocator 110, a channel information receiver 120, an average value calculator 130, a primary carrier determiner 140, and a change requester 150.

Referring to FIG. 6, the channel allocator 110 allocates a channel quality indication channel (hereinafter referred to as "CQICH") to each carrier in order to measure channel qualities of the primary carrier and the secondary carrier (S610).

The terminal 10 measures channel quality information of each carrier and reports the channel quality information of each carrier to the base station 20 at a predetermined cycle. The channel quality information may include a received signal strength indicator (RSSI) or a carrier to interface ratio (CINR). Further, various methods may be used as a method for measuring the RSSI and CINR. For example, the CINR can be measured by transmitting and receiving a pilot signal that both the terminal 10 and the base station 20 know.

When the terminal 10 reports the channel quality information of each carrier to the base station 20, the channel information receiver 120 receives the channel quality information of each carrier and transmits it to the average value calculator 130 (S620).

The average value calculator 130 calculates an average value by averaging the channel quality information of each carrier received during a measurement window period (S630).

The primary carrier determiner 140 determines the primary carrier on the basis of the calculated average value of the channel quality information of each carrier (S640).

More specifically, the primary carrier determiner 140 selects a carrier having the maximum value (MaxAvgCs) of the average values of the channel quality information of carriers corresponding to the secondary carriers (S642). Thereafter, the primary carrier determiner 140 compares the maximum value (MaxAvgCs) with an average value (AvgCp) of the channel quality information of a carrier corresponding to the current primary carrier (S644). At this time, when the average value (AvgCp) corresponding to the current primary is smaller than the maximum value (MaxAvgCs), the primary carrier is changed to the carrier having the maximum value (MaxAvgCs) (S646). Meanwhile, the primary carrier determiner 140 maintains the current primary carrier when the average value (AvgCp) of the channel quality information of the carrier corresponding to the primary carrier is equal to or larger than the maximum value (MaxAvgCs) (S648).

Thereafter, when the primary carrier is changed, the change requester 150 directs the terminal 10 to change the primary carrier by transmitting information of the carrier to be changed to the terminal 10 (S650 to S660).

The change requester 150 may direct the terminal 10 to change the primary carrier by including the information of the primary carrier to be changed in the map message, and may direct the terminal 10 to change the primary carrier by including the information of the primary carrier to be changed in the medium access control (MAC) management message. Further, the change requester 150 may direct the terminal to change the primary carrier by including the information of the primary carrier to be changed in a subheader of a packet data unit (PDU) to be transmitted to the terminal 10. Further, the change requester 150 may direct the terminal 10 to change the primary carrier by using another method.

The terminal 10 that is directed to change the primary carrier from the change requester 150 operates centering on the primary carrier that is changed from the next frame. That is, the terminal 10 maintains physical layer connection through the changed primary carrier, and transmits and receives control information to and from the base station 20. At this time, the carrier corresponding to the previous primary carrier is set as the secondary carrier.

Figure 7:
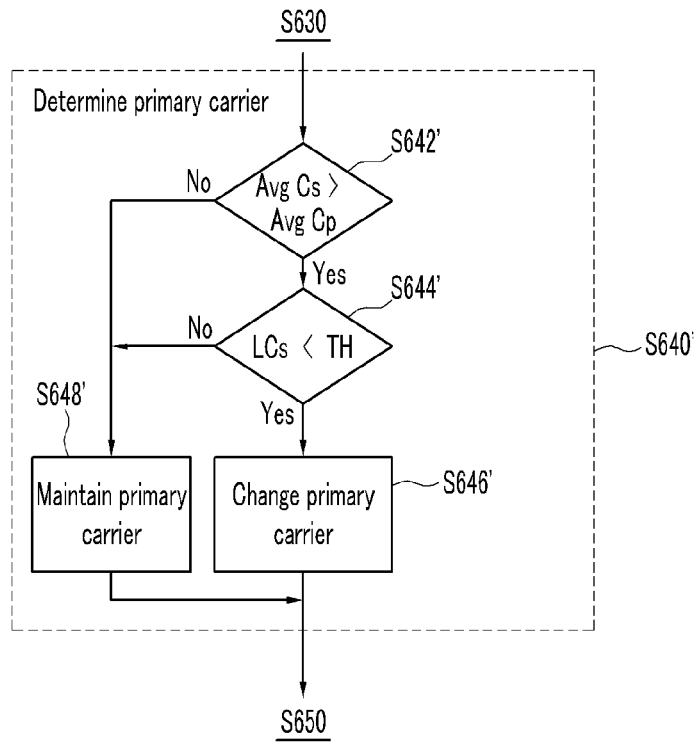
FIG. 7 is a diagram illustrating a method for determining a primary carrier according to a second embodiment of the present invention.

FIG. 7 is a diagram illustrating a method for determining a primary carrier according to a second embodiment of the present invention. In FIG. 7, the AvgCs means the average value of the channel quality information of the secondary carrier, and the AvgCp means the average value of the channel quality information of the current primary carrier.

Referring to FIG. 7, after the average value is calculated by averaging the channel quality information of each carrier by the average value calculator 130 (S630), the primary carrier determiner 140 determines the primary carrier on the basis of the calculated average value (AvgCs) of each carrier and the load distribution value (LCs) of each carrier (S640').

More specifically, the primary carrier determiner 140 determines whether or not the secondary carrier having the average value (AvgCs) larger than the average value of the channel quality information of the current primary carrier of the average values (AvgCs) of the channel quality information of the secondary carriers is present (S642').

Thereafter, the primary carrier determiner 140 compares the load distribution value (LCs) of the secondary carrier having the average value (AvgCs) that is larger than the average value (AvgCp) of the channel quality information of the current primary carrier with a predetermined load distribution value (TH) (S644'). At this time, the primary carrier determiner 140 compares a predetermined load distribution value (TH) with a load distribution value (LCs) of the corresponding secondary carrier from the secondary carrier having a larger average value (AvgCs) of the channel quality information among the secondary carriers having the average value (AvgCs) that is larger than the average value (AvgCp) of the channel quality information of the current primary carrier. The predetermined load distribution value (LCs) is set as a value for determining an overload.

That is, when the load distribution value (LCs) of the secondary carrier having the largest average value (AvgCs) of the channel quality information is smaller than the predetermined load distribution value (TH), the primary carrier determiner 140 changes the primary carrier to the secondary carrier having the largest average value (AvgCs) of the channel quality information (S646'). When the load distribution value (LCs) of the secondary carrier having the largest average value (AvgCs) of the channel quality information is equal to or larger than the predetermined load distribution value (TH), the primary carrier determiner 140 determines whether or not a load distribution value (LCs) of a secondary carrier having the second largest average value (AvgCs) of the channel quality information is equal to or larger than the predetermined load distribution value (TH). When the load distribution value (LCs) of the secondary carrier having the second largest average value (AvgCs) of the channel quality information is smaller than the predetermined load distribution value (TH), the primary carrier is changed to the corresponding secondary carrier (S646').

Meanwhile, the primary carrier determiner 140 maintains the current primary carrier as it is when all the load distribution values (LCs) of the secondary carriers having the average value (AvgCs) that is larger than the average value (AvgCp) of the channel quality information of the current primary carrier are equal to or larger than the predetermined load distribution value (TH) (S648').

Further, the primary carrier determiner 140 maintains the current primary carrier as it is even when there is no secondary carrier having an average value (AvgCs) that is larger than the average value (AvgCp) of the channel quality information of the current primary carrier (S648').

Figure 8:
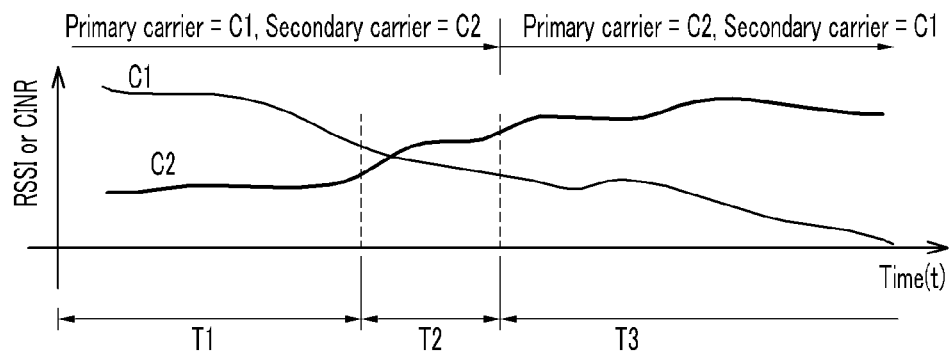
FIG. 8 is a diagram illustrating a change of channel quality information of two carriers as time passes.
Figure 9:
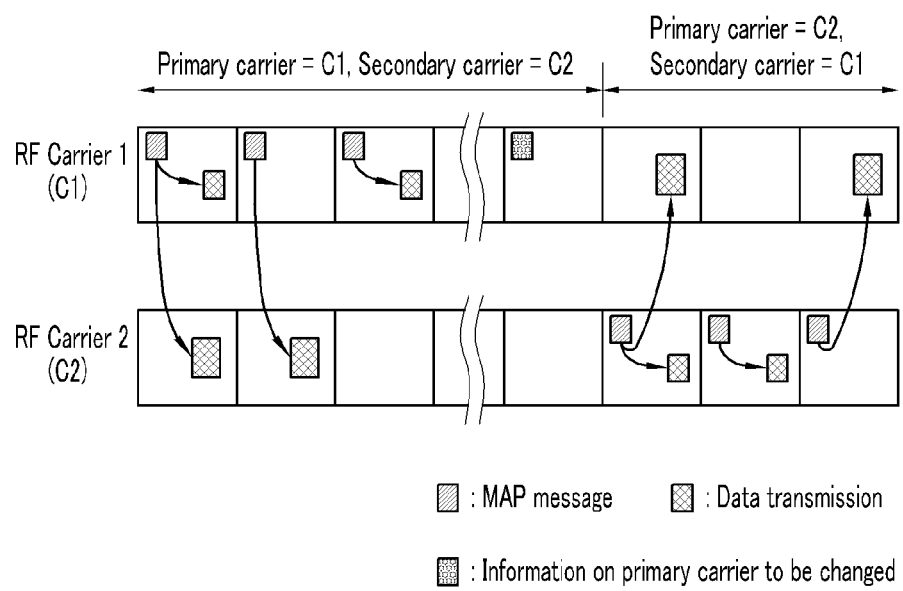
FIG. 9 is a diagram illustrating a method for transmitting data between a terminal and a base station depending on a change of a primary carrier according to an embodiment of the present invention.

FIG. 8 is a diagram illustrating a change of channel quality information of two carriers as time passes, and FIG. 9 is a diagram illustrating a method for transmitting data between a terminal and a base station depending on a change of a primary carrier according to an embodiment of the present invention. In FIGS. 8 and 9, it is illustrated that the terminal supports two carriers C1 and C2, and it is assumed that load distribution values of the two carriers C1 and C2 are smaller than the predetermined load distribution value.

Referring to FIG. 8, in the wireless communication system supporting the multicarrier, a channel quality state of each of the carriers C1 and C2 is changed as time passes. That is, a time interval T1 in which the channel quality state of the carrier C1 is better than the channel quality state of the carrier C2, a time interval T2 in which the channel quality states of the carriers C1 and C2 are changed with each other, and a time interval T3 in which the channel quality state of the carrier C2 is better than the channel quality state of the carrier C1 may be present. The channel quality states of the carriers C1 and C2 can be determined by acquiring an average value of the channel quality information of the carriers C1 and C2 that are periodically reported from the terminal 10 during the measurement window period.

In the time interval T1 in which the channel quality state of the carrier C1 is better than the change quality state of the carrier C2, the carrier C1 of the two carriers C1 and C2 is determined as the primary carrier and the carrier C2 is determined as the secondary carrier. Referring to FIG. 9, in a state when the carrier C1 of the two carriers C1 and C2 is the primary carrier and the carrier C2 is the secondary carrier, the terminal 10 maintains the wireless connection with the base station 20 through the carrier C1. In addition, the base station 20 adds the resource allocation information for the data to the map message to transmit the resource allocation information to the terminal 10 through the carrier C1 for each frame, and transmits the data by using the carrier corresponding to the resource allocation information.

As shown in FIG. 9, the base station 20 can transmit the data through the carriers C1 and C2 in the first frame, transmit the data through the carrier C2 in the second frame, and transmit the data through the carrier C1 in the third frame. The resource allocation information in each frame includes information on the carrier through which the corresponding data is transmitted in each frame.

The terminal 10 receives the corresponding data by using the resource allocation information after receiving the map message.

Meanwhile, in the time interval T2 in which the channel quality states of the carriers C1 and C2 are changed with each other, the average value of the channel quality information of the carrier C2 is larger than the average value of the channel quality information of the carrier C1. In this case, the carrier C2 of the two carriers C1 and C2 is determined as the primary carrier and the carrier C1 is determined as the secondary carrier.

Therefore, the multi-carrier managing apparatus 100 of the base station 20 changes the primary carrier to the carrier C2 and transmits information on the primary carrier to be changed, that is, the information on the carrier C2, to the terminal 10 through the carrier C1 corresponding to the current primary carrier.

The terminal 10 that receives the information on the primary carrier to be changed through the primary carrier C1 maintains the wireless connection with the base station 20 through the carrier C2 in the time interval T3 in which the channel quality state of the carrier C2 is continuously better than the channel quality state of the carrier C1, and receives the map message from the base station 20 through the carrier C2 corresponding to the primary carrier.

That is, the primary carrier is the carrier C1 and the secondary carrier is the carrier C2 in the time intervals T1 and T2, and the primary carrier is the carrier C2 and the secondary carrier is the carrier C1 in the time interval T3. The base station 20 transmits the map message including the resource allocation information of each of the carriers C1 and C2 for the data to the terminal 10 through the primary carrier in each of the time intervals T1 to T3.

According to the above-mentioned exemplary embodiments of the present invention, an apparatus and a method for changing a primary carrier was described. However, the present invention may be applied variety according to the fundamental notions which the primary carrier may change whenever necessary in a wireless system supporting the multi-carrier.

For example, a method for managing a multi-carrier in a communication system supporting the multi-carrier according to the fundamental notions may include assigning the carriers to a primary carrier or a secondary carrier, re-assignning one of the carriers assigned to the secondary carrier to the primary carrier, and changing the primary carrier according to the re-assignning. That is, a primary carrier may be change a primary carrier from one primary carrier to other carrier in a communication system supporting the multi-carrier.

The above-mentioned exemplary embodiments of the present invention are not embodied only by a apparatus and/ or method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

Further, while this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for managing a multi-carrier in a base station of a communication system supporting the multi-carrier, the method comprising:
   receiving channel quality information of the multi-carrier from a terminal;
   determining an average value of channel quality information of each carrier;
   determining a new primary carrier based on the average value of channel quality information of each carrier; and
   transmitting control information directing the terminal to change a primary carrier from a current primary carrier to the new primary carrier through the current primary carrier,
   wherein the control information includes information on the new primary carrier, and
   wherein the determining of the new primary carrier includes:
      averaging channel quality information of each carrier during a measurement window period;
      electing carriers having average values that are larger than an average value of the current primary carrier among average values of the channel quality information of the multi-carrier; and
      determining a primary carrier to be a carrier having a value that is smaller than the predetermined load distribution value as the new primary carrier.

2. The method of claim 1, wherein the transmitting of the control information includes transmitting a resource allocation message including information on the new primary carrier.

3. The method of claim 1, wherein the transmitting of the control information includes transmitting a medium access control (MAC) management message including the information on the new primary carrier.

4. The method of claim 1, wherein the transmitting of the control information includes adding the information on the new primary carrier to one of a map message, a medium access control (MAC) management message, and a subheader of a packet data unit and transmitting the one of the map message, the MAC management message, and the packet data unit subheader to the terminal.

5. The method of claim 1, wherein the determining of the new primary carrier includes determining a carrier having the maximum value among an average values of the channel quality information of the multi-carriers as the new primary carrier.

6. The method of claim 1, wherein the determining of the new primary carrier further includes:
   comparing a predetermined load distribution value with a load distribution value of the corresponding carrier from the carrier having the largest average value among the average values of the channel quality information of the selected carriers.

7. The method of claim 1, wherein the receiving includes:
allocating a channel quality information report channel to each of the multi-carriers; and
receiving the channel quality information of each carrier through the channel quality information report channel of each carrier from the terminal.

8. The method of claim 1, wherein the channel quality information is a received signal strength indication (RSSI) or a carrier to interface and noise ratio (CINR).

9. An apparatus for managing a multi-carrier in a base station of a communication system supporting the multi-carrier, the apparatus comprising:
a channel information receiver that receives channel quality information of each of the multi-carriers from a terminal;
an average value calculator that determines an average value of the channel quality information of each carrier; and
a primary carrier determiner that determines a new primary carrier based on the average value of channel quality information of each carrier; and
a change requester that transmitting control information directing the terminal to change a primary carrier from a current primary carrier to the new primary carrier through the current primary carrier,
wherein the control information includes information on the new primary carrier, and
wherein the primary carrier determiner selects a carrier having average values of the channel quality information that are larger than an average value of channel quality information of the current primary carrier among the multi-carriers, and determines a carrier having a load distribution value that is smaller than a predetermined load distribution among the selected carriers as the one carrier as the new primary carrier.

10. The apparatus of claim 9, wherein the change requester adds information on the new primary carrier to one of a map message, a medium access control (MAC) management message, and a subheader of a packet data unit and transmits the one of the map message, the MAC management message, and the packet data unit subheader to the terminal.

11. A method for managing a multi-carrier in a base station of a communication system supporting the multi-carrier, the method comprising:
receiving channel quality information of the multi-carriers from a terminal;
determining an average value of channel quality information of each carrier;
determining a new primary carrier based on the average value of channel quality information of each carrier and a load distribution value of the multi-carriers; and
transmitting control information directing the terminal to change a primary carrier from a current primary carrier to the new primary carrier through the current primary carrier,
wherein the control information includes information on the new primary carrier, and
wherein the determining of the new primary carrier includes:
averaging channel quality information of each carrier during a measurement window period; and
determining a primary carrier to a carrier having a value that is smaller than the predetermined load distribution value as the new primary carrier.

12. The method of claim 11, wherein the directing includes adding information on the new primary carrier to be changed to one of a map message, a medium access control (MAC) management message, and a subheader of a packet data unit and transmitting the one of the map message, the MAC management message, and the packet data unit subheader to the terminal.

13. The method of claim 11, wherein the determining of the new primary carrier further includes:
from the carrier having the largest average value among the average values of the channel quality information of the selected carrier, comparing a load distribution value of the corresponding carrier with a predetermined load distribution value.

14. A method for managing a multi-carrier in a communication system supporting the multi-carrier, the method comprising:
assigning the carriers to a primary carrier or a secondary carrier;—re-assigning one of the carriers assigned to the secondary carrier to the primary carrier based on an average value of channel quality information of each carrier; and
changing the primary carrier according to the re-assigning, wherein the determining of the new primary carrier includes:
averaging channel quality information of each carrier during a measurement window period;
selecting a carrier having an average value larger that is than an average value of the current primary carrier among average values of the channel quality information of the multi-carrier; and
determining a primary carrier to a carrier having a value that is smaller than the predetermined load distribution value as the new primary carrier.

* * * * *